(12) United States Patent
Yoshino (10) Patent No.: US 9,767,851 B2
(45) Date of Patent: Sep. 19, 2017

(54) DOCUMENT CAMERA, VIDEO AND AUDIO OUTPUT SYSTEM, AND VIDEO AND AUDIO OUTPUT METHOD

(71) Applicant: Seiko Epson Corporation, Tokyo (JP)

(72) Inventor: Yasunori Yoshino, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 335 days.

(21) Appl. No.: 14/061,449

(22) Filed: Oct. 23, 2013

(65) Prior Publication Data
US 2014/0147089 A1    May 29, 2014

(30) Foreign Application Priority Data

Nov. 29, 2012  (JP) .................................. 2012-261490

(51) Int. Cl.
| | |
|---|---|
| *H04N 5/77* | (2006.01) |
| *H04N 5/775* | (2006.01) |
| *G11B 27/10* | (2006.01) |
| *H04N 9/82* | (2006.01) |

(52) U.S. Cl.
CPC ............. *G11B 27/10* (2013.01); *H04N 5/772* (2013.01); *H04N 9/8205* (2013.01); *H04N 9/8211* (2013.01)

(58) Field of Classification Search
CPC .... H04N 5/772; H04N 9/8205; H04N 9/8211; G11B 27/10
USPC ......................................... 386/224, 230, 231
See application file for complete search history.

(56) References Cited

U.S. PATENT DOCUMENTS

| | | | | |
|---|---|---|---|---|
| 6,683,649 | B1* | 1/2004 | Anderson | 348/333.05 |
| 7,903,137 | B2* | 3/2011 | Oxford et al. | 348/14.01 |
| 2007/0291108 | A1* | 12/2007 | Huber et al. | 348/14.02 |
| 2010/0188585 | A1 | 7/2010 | Ichieda | |
| 2012/0015333 | A1* | 1/2012 | Self et al. | 434/167 |

FOREIGN PATENT DOCUMENTS

JP       2010-177736 A      8/2010

* cited by examiner

*Primary Examiner* — Nigar Chowdhury
(74) *Attorney, Agent, or Firm* — ALG Intellectual Property, LLC (57) ABSTRACT

A document camera includes: a camera unit which acquires a video signal; a microphone unit which acquires an audio signal; a stamp adding unit which adds a time stamp for synchronizing the video signal and the audio signal with each other to the video signal and the audio signal that are acquired; a mode switching button which switches between a "video recording mode" and a "sound reinforcement mode"; a video recording unit which records the video signal and the audio signal together with the time stamp if the "video recording mode" is switched on; and a sound reinforcement instruction unit which instructs a projector to output the video signal and the audio signal, ignoring the time stamp, if the "sound reinforcement mode" is switched on.

9 Claims, 7 Drawing Sheets

DOCUMENT CAMERA, VIDEO AND AUDIO OUTPUT SYSTEM, AND VIDEO AND AUDIO OUTPUT METHOD

CROSS-REFERENCE TO RELATED APPLICATION

The entire disclosure of Japanese Patent Application No. 2012-261490, filed Nov. 29, 2012 is expressly incorporated by reference herein.

BACKGROUND

1. Technical Field

The present invention relates to a document camera having an audio signal acquisition unit and a camera unit, and to a video and audio output system and a video and audio output method.

2. Related Art

According to a related art, an image display system having a document camera and a projector directly connected to the document camera via a USB interface is known (see JP-A-2010-177736). The document camera picks up an image of a target object and transmits a stream of the picked-up image (video signal) to the projector. The projector receives the stream, carries out image processing on the image of the stream, and then executes projection of the processed image. In this image display system, since the document camera and the projector are directly connected to each other via the USB interface without using a computer in-between, even a user who is unaccustomed to machine operation can easily operate the system.

Incidentally, with respect to the image display system of this type, a configuration in which the document camera further includes a video recording unit for recording a video signal so that the video signal is recorded or played back is known. Also, a configuration in which the document camera further includes an audio signal acquisition unit for acquiring an audio signal so that the audio signal is recorded or played back together with the video signal is known. In such configurations, a time stamp for synchronizing the video signal with the audio signal is added by the USB (Universal Serial Bus) interface. That is, the projector synchronizes the video signal with the audio signal based on the time stamp and thus outputs these signals.

Also, in such configurations, outputting the video signal and the audio signal acquired by the document camera, in real time from the projector utilizing a part of the video recording (audio recording)/playback function for the video signal and the audio signal (sound reinforcement function), is considered.

However, in such configurations, since the projector synchronizes the video signal with the audio signal based on the time stamp and thus outputs these signals, one of the signals is outputted with a delay in accordance with the other signal which takes a longer processing time. Therefore, there is a problem that the audio signal, in particular, is outputted with an extremely large delay from the time point of audio acquisition. This is not practical for the sound reinforcement function.

SUMMARY

An advantage of some aspects of the invention is to provide a document camera, a video and audio output system and a video and audio output method which can prevent output of an audio signal with an extremely large delay from the time point of audio acquisition when using sound reinforcement.

An aspect of the invention is directed to a document camera including: a video signal acquisition unit which acquires a video signal; an audio signal acquisition unit which acquires an audio signal; a stamp adding unit which adds a time stamp for synchronizing the video signal and the audio signal with each other to the video signal and the audio signal that are acquired; a mode switching unit which switches between plural modes including a video recording mode in which a video is recorded and a sound reinforcement mode in which sound reinforcement is carried out; a video recording unit which records the video signal and the audio signal together with the time stamp if the video recording mode is switched on; and a sound reinforcement instruction unit which instructs an output device to output the video signal and the audio signal, ignoring the time stamp, if the sound reinforcement mode is switched on.

In this case, it is preferable that the output device is an external output device and that the sound reinforcement instruction unit transmits the video signal and the audio signal, and a control parameter that validates the ignoring of the time stamp, to the output device if the sound reinforcement mode is switched on.

Another aspect of the invention is directed to a video and audio output method using a document camera having a video signal acquisition unit which acquires a video signal and an audio signal acquisition unit which acquires an audio signal. The method includes causing the document camera to execute: adding a time stamp for synchronizing the video signal and the audio signal with each other to the video signal and the audio signal that are acquired; switching between plural modes including a video recording mode in which a video is recorded and a sound reinforcement mode in which sound reinforcement is carried out; recording the video signal and the audio signal together with the time stamp if the video recording mode is switched on; and instructing an output device to output the video signal and the audio signal, ignoring the time stamp, if the sound reinforcement mode is switched on.

According to these configurations, if the sound reinforcement mode is switched on, the video signal and the audio signal are outputted, ignoring the time stamp. Therefore, when sound reinforcement is used, the output device outputs the video signal and the audio signal asynchronously. By thus canceling synchronous output from the output device and outputting the signals asynchronously, there is no delay of the audio signal in accordance with the video signal. Therefore, when sound reinforcement is used, output of the audio signal with an extremely large delay from the time point of audio acquisition can be prevented. The "output device" used here is a concept including an external output device and an output device provided in the document camera (internal output device). There may be plural output devices, and one output device may output the video signal while the other output device may output the audio signal.

In the document camera, it is preferable that the sound reinforcement instruction unit further transmits a control parameter about audio processing if the sound reinforcement mode is switched on.

In this case, it is preferable that the control parameter about audio processing includes a control parameter that validates echo cancellation.

Also, it is preferable that the control parameter about audio processing includes a control parameter about volume control and/or sound quality control.

According to these configurations, when sound reinforcement is used, audio processing such as echo cancellation, volume control and sound quality control is carried out. Therefore, problems (for example, acoustic feedback or the like) and needs specific to the use of sound reinforcement can be properly dealt with. The "sound quality control" is a concept including range control and the like.

Still another aspect of the invention is directed to a video and audio output system including a document camera which acquires a video signal and an audio signal, and an output device which outputs the video signal and the audio signal acquired by the document camera. The document camera includes: a video signal acquisition unit which acquires the video signal; an audio signal acquisition unit which acquires the audio signal; a stamp adding unit which adds a time stamp for synchronizing the video signal and the audio signal with each other to the video signal and the audio signal that are acquired; a mode switching unit which switches between plural modes including a video recording mode in which a video is recorded and a sound reinforcement mode in which sound reinforcement is carried out; a video recording unit which records the video signal and the audio signal together with the time stamp if the video recording mode is switched on; and a sound reinforcement instruction unit which instructs the output device to output the video signal and the audio signal, ignoring the time stamp, if the sound reinforcement mode is switched on. The output device has an output unit which outputs the video signal and the audio signal outputted from the document camera, according to the instruction from the sound reinforcement instruction unit.

According to this configuration, if the sound reinforcement mode is switched on, the video signal and the audio signal are outputted, ignoring the time stamp. Therefore, when sound reinforcement is used, the output device outputs the video signal and the audio signal asynchronously. By thus canceling synchronous output from the output device and outputting the signals asynchronously, there is no delay of the audio signal in accordance with the video signal. Therefore, when sound reinforcement is used, output of the audio signal with an extremely large delay from the time point of audio acquisition can be prevented.

In this case, it is preferable that the output device further includes a transmission unit which transmits a control parameter about audio output setting to the document camera.

According to this configuration, since the audio signal can be outputted (transmitted) with the audio output setting designated by the output device, proper data transmission to the output device can be carried out.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a document camera, a video and audio output system and a video and audio output method according to an embodiment of the invention will be described with reference to the accompanying drawings. In this embodiment, a projector system (video and audio output system) using a document camera according to an embodiment of the invention will be described. Particularly, this projector system is configured in such a way that synchronism/asynchronism of a video signal and an audio signal is controlled to prevent a delay of audio output when sound reinforcement is used.

Figure 1:
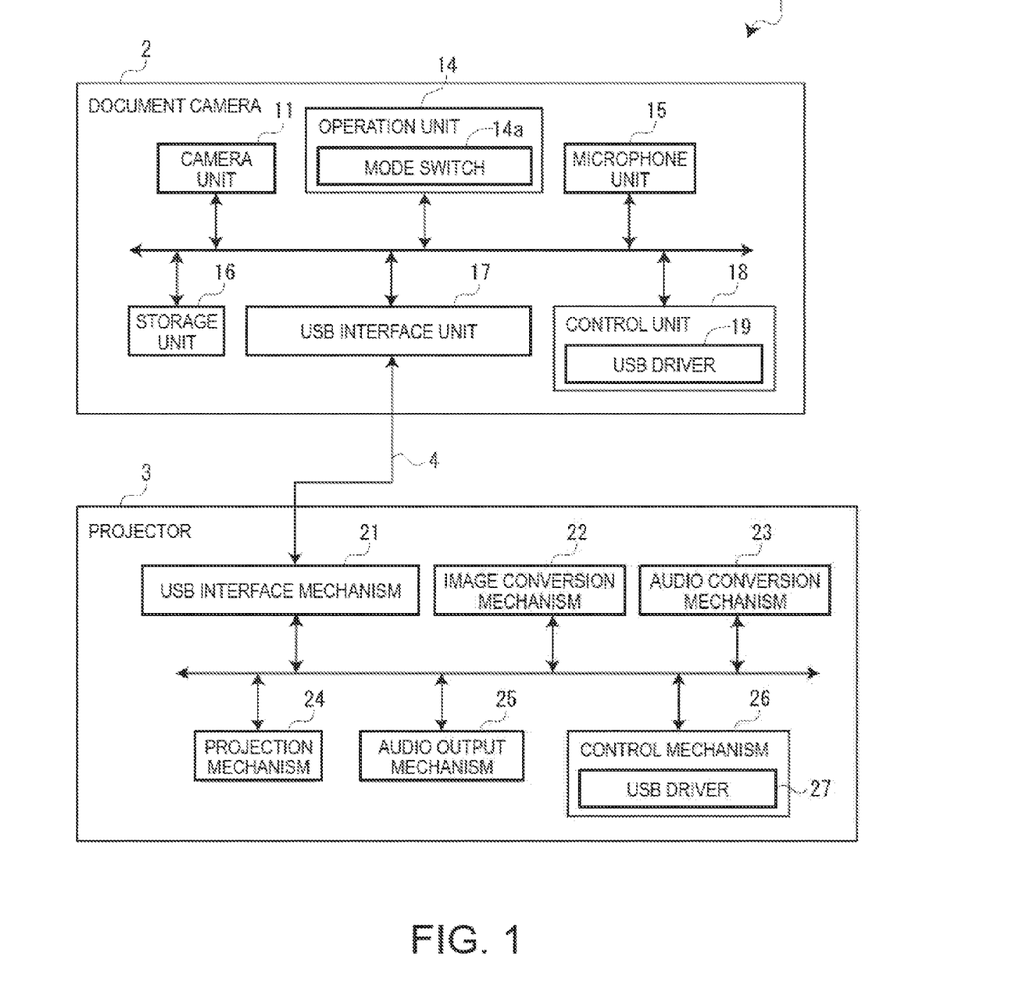
FIG. 1 shows the system configuration of a projector system according to an embodiment of the invention.

As shown in FIG. 1, a projector system 1 has a document camera 2 and a projector 3 (output device) to which the document camera 2 is connected via a USB cable 4. In the projector system 1, a video signal and an audio signal acquired by the document camera 2 are outputted in the form of projection display and audio output from the projector 3.

Figure 2:
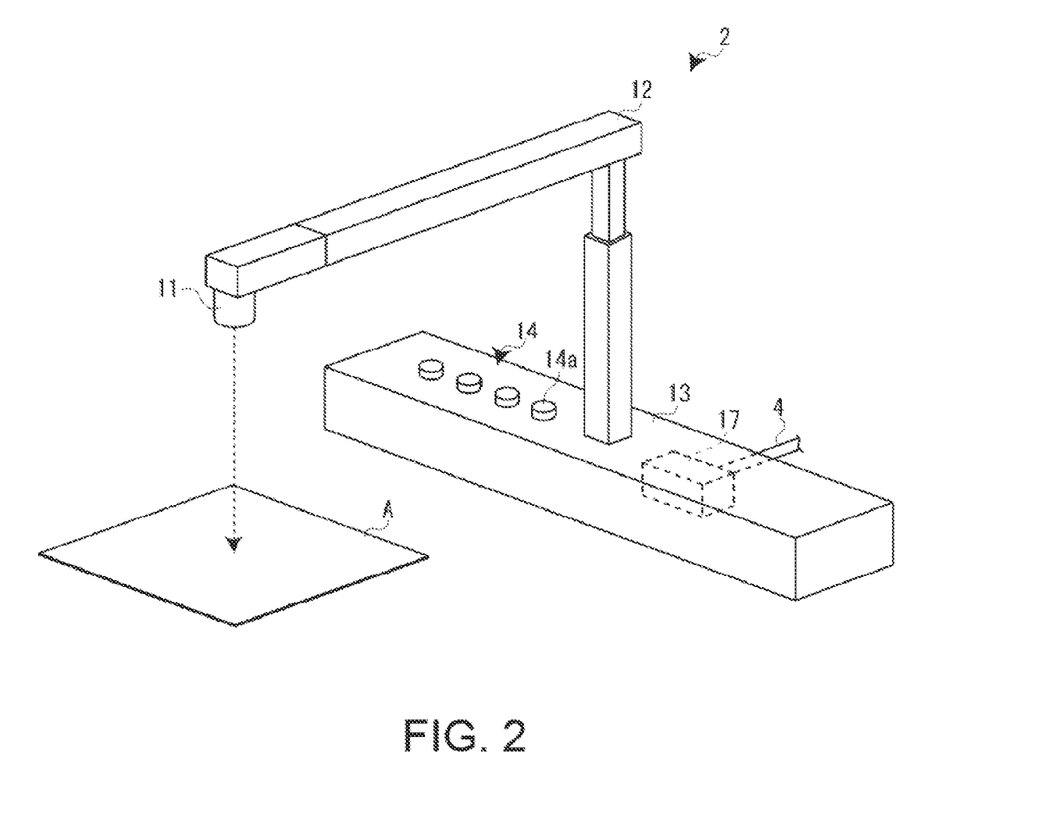
FIG. 2 is a perspective view schematically showing a document camera.

As shown in FIGS. 1 and 2, the document camera 2 has a camera unit (video signal acquisition unit) 11, a supporting arm 12 supporting the camera unit 11, a main body unit 13 on which the supporting arm 12 is provided upright, and an operation unit 14 arranged on the main body unit 13. The document camera 2 also has inside a microphone unit (audio signal acquisition unit) 15, a storage unit 16, a USB interface unit 17, and a control unit 18 which controls each of these units.

The camera unit 11 is formed by a CCD camera or the like. The camera unit 11 picks up an image of an image pickup target A and acquires a video signal. The supporting arm 12 supports the camera unit 11 and is capable of changing the angle of the camera unit 11 and moving the camera unit 11 forward and backward, left and right, and up and down.

The operation unit 14 is a unit for a user to carry out various settings and operations and has various operation buttons. The various operation buttons include a mode switching button (mode switching unit) 14a for switching (setting) the use mode of the projector system 1 between a "sound reinforcement mode" in which sound reinforcement is carried out, a "video recording mode" in which video recording is carried out, and a "playback mode" in which playback is carried out. The "sound reinforcement mode" is a mode in which a video signal and an audio signal acquired by the document camera 2 are outputted in real time from the projector 3. Meanwhile, the "video recording mode" is a mode in which a video signal and an audio signal acquired by the document camera 2 are recorded (video recording/audio recording) in the storage unit 16 in the document camera 2 in such away that these signals can be played back. The "playback mode" is a mode in which the video signal and the audio signal recorded in the "video recording mode" are outputted from the projector 3 (playback processing). As described in detail later, if the "sound reinforcement mode" is on, the video signal and the audio signal are outputted asynchronously from the projector 3. If the "playback mode" is on, the video signal and the audio signal are outputted synchronously from the projector 3.

The microphone unit 15 acquires an audio signal from sounds in the surroundings of the document camera 2. As described in detail later, the acquired audio signal is soundreinforced if the use mode is switched to the "sound reinforcement mode". The acquired audio signal is recorded if the use mode is switched to the "video recording mode".

The storage unit 16 stores the video signal acquired by the camera unit 11 and the audio signal acquired by the microphone unit 15. Specifically, if the "video recording mode" is switched on, the storage unit 16 stores the video signal and the audio signal in a non-volatile manner.

The USB interface unit 17 sends and receives various signals to and from the projector 3 via the USB cable 4. Specifically, the USB interface unit 17 sends (transmits) the video signal and the audio signal stored in the storage unit 16 and sends and receives control signals such as control parameters to and from the projector 3.

The control unit 18 includes a CPU (Central Processing Unit), a RAM (Random Access Memory), and a ROM (Read Only Memory) and the like. The control unit 18 is also equipped with a USB driver 19. The control unit 18 adds a time stamp for synchronizing the video signal and the audio signal with each other to the video signal and the audio signal, in accordance with the USB driver 19. Also, the control unit 18 performs transmission control of the video signal and the audio signal in accordance with the USB driver 19. In addition, if the "video recording mode" is switched on, the control unit 18 records the video signal and the audio signal into the storage unit 16. Moreover, as described in detail later, the control unit 18 sends a control parameter that validates the ignoring of the time stamp to the projector 3 via the USB interface unit 17. By doing so, the control unit 18 instructs the projector 3 to output the video signal and the audio signal, ignoring the time stamp. The time stamp adding unit is formed by the control unit 18 and the USB driver 19. The video recording unit is formed by the control unit 18. The sound reinforcement instruction unit is formed by the USB interface unit 17 and the control unit 18.

As shown in FIG. 1, the projector 3 has a USB interface mechanism 21, an image conversion mechanism 22, an audio conversion mechanism 23, a projection mechanism (output unit) 24, an audio output mechanism (output unit) 25, and a control mechanism 26 which controls each of these mechanisms.

The USB interface mechanism 21 sends and receives various signals to and from the document camera 2 via the USB cable 4. Specifically, the USB interface mechanism 21 receives the video signal and the audio signal from the document camera 2 and sends and receives control signals such as control parameters to and from the document camera 2.

The image conversion mechanism 22 converts a digital video signal into an analog video signal. Meanwhile, the audio conversion mechanism 23 converts a digital audio signal into an analog audio signal.

The projection mechanism 24 has a light source lamp, a liquid crystal light valve, and a projection lens or the like and projects and displays the video signal converted into the analog signal, as a video on a screen. The audio output mechanism 25 outputs the audio signal converted into the analog signal, as a sound.

The control mechanism 26 includes a CPU, a RAM, and a ROM or the like. The control mechanism 26 is equipped with a USB driver 27. The control mechanism 26 controls the reception of the video signal and the audio signal in accordance with the USB driver 27.

Here, a video signal and audio signal output operation in the projector system 1 will be described with reference to FIGS. 3 and 4. This output operation is executed after the user switches the use mode to the "sound reinforcement mode" or the "video recording mode", using the mode switching button 14a (mode switching process). Also, this output operation is executed after connection detection processing, configuration setting processing, and USB class driver loading processing are carried out.

The connection detection processing is processing in which it is detected that the USB interface unit 17 in the document camera 2 and the USB interface mechanism 21 in the projector 3 are connected to each other. The configuration setting processing is processing in which the projector 3 requests a configuration descriptor and the document camera 2 returns the configuration descriptor. The configuration descriptor includes information that the document camera 2 operates according to USB standards, and a list of the functions of the document camera 2 that can be controlled by the projector 3, the resolution of frames supported, the format of frames supported (MJPEG/YUV), the type of color space (sRGB/BT.470-2(M)/BT.470-2(R,G)/SMPTE170M/SMPTE240M) and the like. The USB class driver loading processing is processing in which a USB video class driver and a USB audio class driver are loaded.

Figure 3:
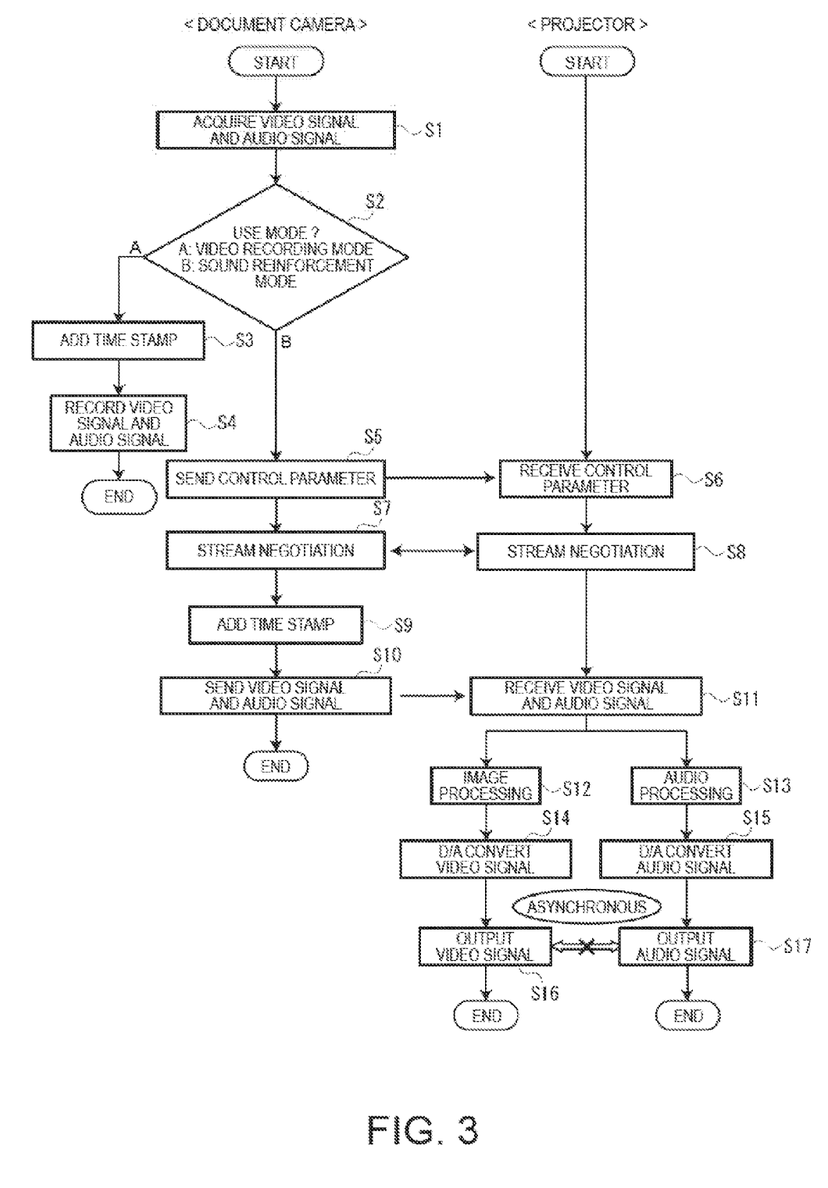
FIG. 3 is a flowchart showing a video signal and audio signal output operation in the projector system.
Figure 4:
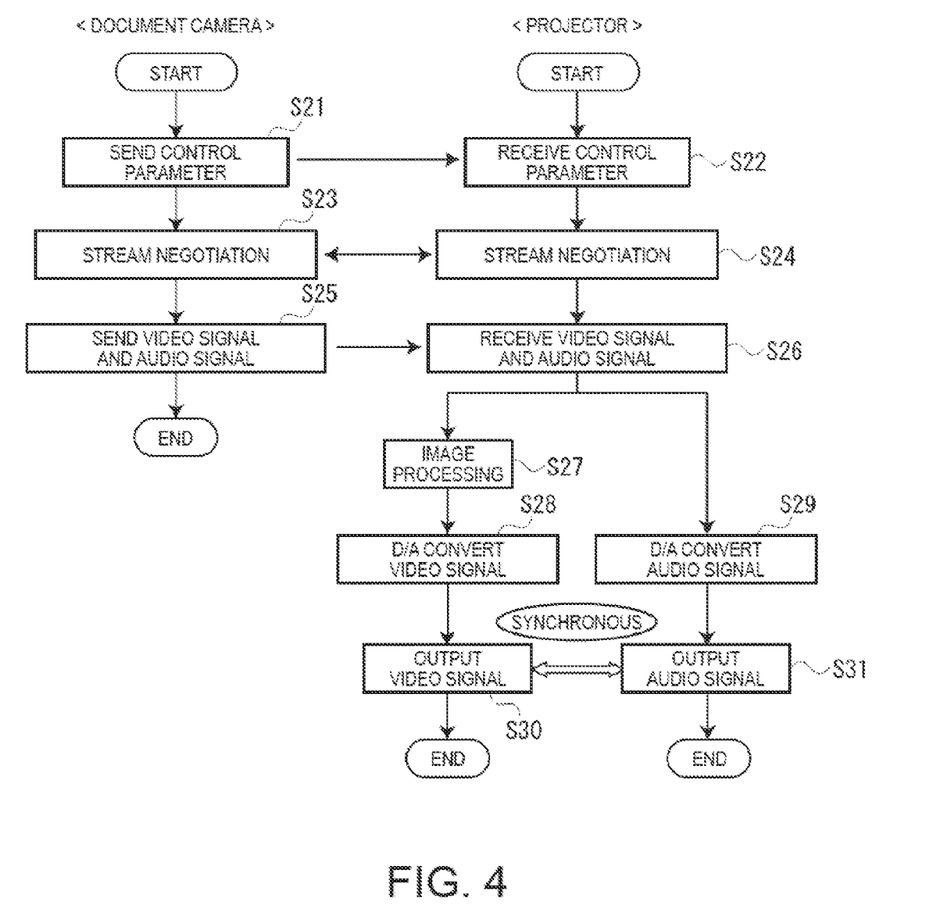
FIG. 4 is a flowchart showing a video signal and audio signal playback process in the projector system.

As shown in FIG. 3, the document camera 2 first causes the camera unit 11 and the microphone unit 15 to acquire a video signal and an audio signal (S1). After the video signal and the audio signal are acquired, the document camera 2 causes the control unit 18 to determine whether the use mode is switched to the "sound reinforcement mode" or to the "video recording mode" (S2). If it is determined the "video recording mode" is switched on (S2: A), the document camera 2 causes the control unit 18 to add the time stamp to the acquired video signal and audio signal according to the USB driver 19 (S3: stamp addition process). After that, the document camera 2 causes the control unit 18 to record the video signal and the audio signal together with the time stamp into the storage unit 16 (video recording processing) (S4: video recording process). Playback processing of the video signal and the audio signal recorded here will be described later.

Meanwhile, if it is determined that the "sound reinforcement mode" is switched on (S2: B), the document camera 2 causes the USB interface unit 17 and the control unit 18 to send control parameters to the projector 3 (S5: sound reinforcement instruction process). Strictly speaking, the document camera 2 sends control parameters to the projector 3 in the form of a response to a request from the projector 3. These control parameters include setting range values of the functions of the document camera 2 (zoom, contrast control, brightness control and the like) that can be controlled from the projector 3, current setting values (Min/Max) of the functions, and the like. The control parameters in the case where the "sound reinforcement mode" is switched on include a control parameter that validates the ignoring of the time stamp, a control parameter that validates echo cancellation, a control parameter about volume control, and a control parameter about range control (Bass/Treble level control). The projector 3 causes the USB interface mechanism 21 to receive the control parameters from the document camera 2 (S6).

After that, the document camera 2 and the projector 3 carry out stream negotiation (S7 and S8). Specifically, the document camera 2 and the projector 3 communicates with each other and finalize conditions (transmission conditions) for transmitting (stream transmission) the video signal such as frame resolution, frame format, interval, and band width.

When the stream negotiation is finished, the document camera 2 causes the USB interface unit 17 and the control unit 18 to add the time stamp to the acquired video signal and audio signal (S9) and to send the video signal and the audio signal to the projector 3 (S10). Strictly speaking, the document camera 2 transmits (stream transmission) the video signal and the audio signal in the form of a response to a request from the projector 3. The projector 3 causes the USB interface mechanism 21 to receive the video signal and the audio signal (with the time stamp added) from the document camera 2 (S11).

As the video signal and the audio signal are received, the projector 3 causes the control mechanism 26 to carry out image processing on the received video signal and audio processing on the received audio signal (S12 and S13). In the audio processing, echo cancellation is carried out and volume control and range control are carried out, based on the control parameters. After that, the projector 3 causes the image conversion mechanism 22 and the audio conversion mechanism 23 to convert the processed digital video signal and audio signal into analog signals (S14 and S15).

After that, the projector 3 outputs the converted video signal and audio signal, ignoring the time stamp according to the control parameter which validates the ignoring of the time stamp (S16 and S17). That is, according to this control parameter, synchronous output based on the time stamp is canceled and the video signal and the audio signal are outputted asynchronously. Specifically, the projector 3 causes the projection mechanism 24 to output the processed video signal (S16) and causes the audio output mechanism 25 to output the processed audio signal (S17). Then, this output operation ends.

Next, playback processing of the video signal and the audio signal recorded in the video recording processing (S4) will be described. This playback processing is executed as the user carries out a playback operation after the use mode is switched to the "playback mode". As shown in FIG. 4, control parameters are sent to the projector 3 via the USB interface unit 17 and the control unit 18 (S21). However, the control parameters sent in the case of playback do not include the control parameter that validates the ignoring of the time stamp, the control parameter that validates echo cancellation, the control parameter for carrying out volume control, and the control parameter for carrying out range control. The projector 3 causes the USB interface mechanism 21 to receive the control parameters from the document camera 2 (S22).

After that, the document camera 2 and the projector 3 carry out stream negotiation (S23 and S24). When the stream negotiation is finished, the document camera 2 causes the USB interface unit 17 and the control unit 18 to send the video signal and the audio signal to the projector 3 (S25). The projector 3 causes the USB interface mechanism 21 to receive the video signal and the audio signal (with the time stamp added) from the document camera 2 (S26).

As the video signal and the audio signal are received, the projector 3 causes the control mechanism 26 to carry out image processing on the received video signal (S27). After that, the projector 3 causes the image conversion mechanism 22 and the audio conversion mechanism 23 to convert the digital video signal and audio signal into analog signals (S28 and S29).

After that, the projector 3 outputs the converted video signal and audio signal synchronously, based on the time stamp (S30 and S31). That is, since the control parameter that validates the ignoring of the time stamp is not received, the video signal and the audio signal are outputted in synchronous output, which is the default setting. Then, this playback processing ends.

According to the configuration as described above, if the "sound reinforcement mode" is switched on, the video signal and the audio signal are outputted, ignoring the time stamp. Therefore, when sound reinforcement is used, the projector 3 outputs the video signal and the audio signal asynchronously. By thus canceling synchronous output from the projector 3 and outputting the signals asynchronously, there is no delay of the audio signal in accordance with the video signal. Therefore, when sound reinforcement is used, output of the audio signal with an extremely large delay from the time point of audio acquisition can be prevented.

Also, if the "sound reinforcement mode" is switched on, the control parameters about audio processing (the control parameter for validating echo cancellation and the control parameters about volume control/range control) are transmitted. Therefore, when sound reinforcement is used, audio processing (echo cancellation, volume control, and range control) can be carried out. Thus, problems (for example, acoustic feedback or the like) and needs specific to the use of sound reinforcement can be properly dealt with.

In this embodiment, the projector 3 may be configured to cause the USB interface mechanism 21 and the control mechanism 26 to send the control parameters about audio output setting (volume setting and sound quality setting) to the document camera 2. According to this configuration, since the audio signal can be outputted (transmitted) by the audio output setting designated by the projector 3, proper data transmission to the projector 3 can be carried out. The transmission unit mentioned in the appended claims is formed by the USB interface mechanism 21 and the control mechanism 26.

Also, in the embodiment, the document camera 2 sends the control parameter that validates the ignoring of the time stamp to the projector 3. Therefore, the document camera 2 is configured to instruct the projector 3 to output the video signal and the audio signal, ignoring the time stamp. However, possible configurations are not limited to this example. For example, the document 2 may be configured to give the instruction to the projector 3 by deleting the time stamp on the video signal and the audio signal.

Moreover, while in the embodiment, the storage unit storing the video signal and the audio signal in a non-volatile manner is provided in the document camera 2, the storage unit 16 may be provided in the projector 3. In such a case, when it is determined that the "video recording mode" is switched on (S3: A), the control parameters are sent and the video signal and the audio signal are sent to the projector 3 according to an instruction from the control unit 18, and the video signal and the audio signal are recorded into the storage unit 16 in the projector 3.

Furthermore, while in the embodiment, the projector 3 is used as an output device (external output device) to which the document camera 2 is connected, possible output devices are not limited to this example and any output device that outputs the video signal and the audio signal can be used. For example, a personal computer may be used as an output device. In such a case, the storage unit 16 may be provided in the personal computer. A monitor with a speaker may also be used as an output device.

Figure 5:
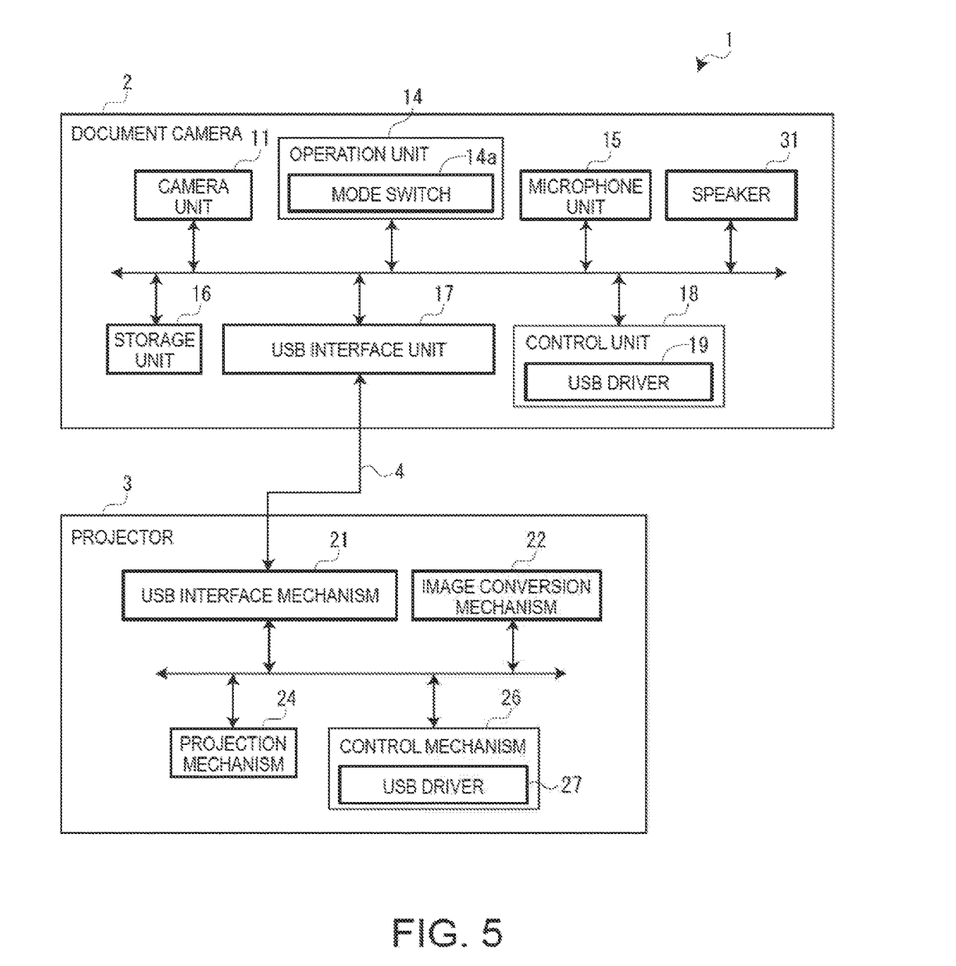
FIG. 5 shows the system configuration of a first modification of the projector system.
Figure 6:
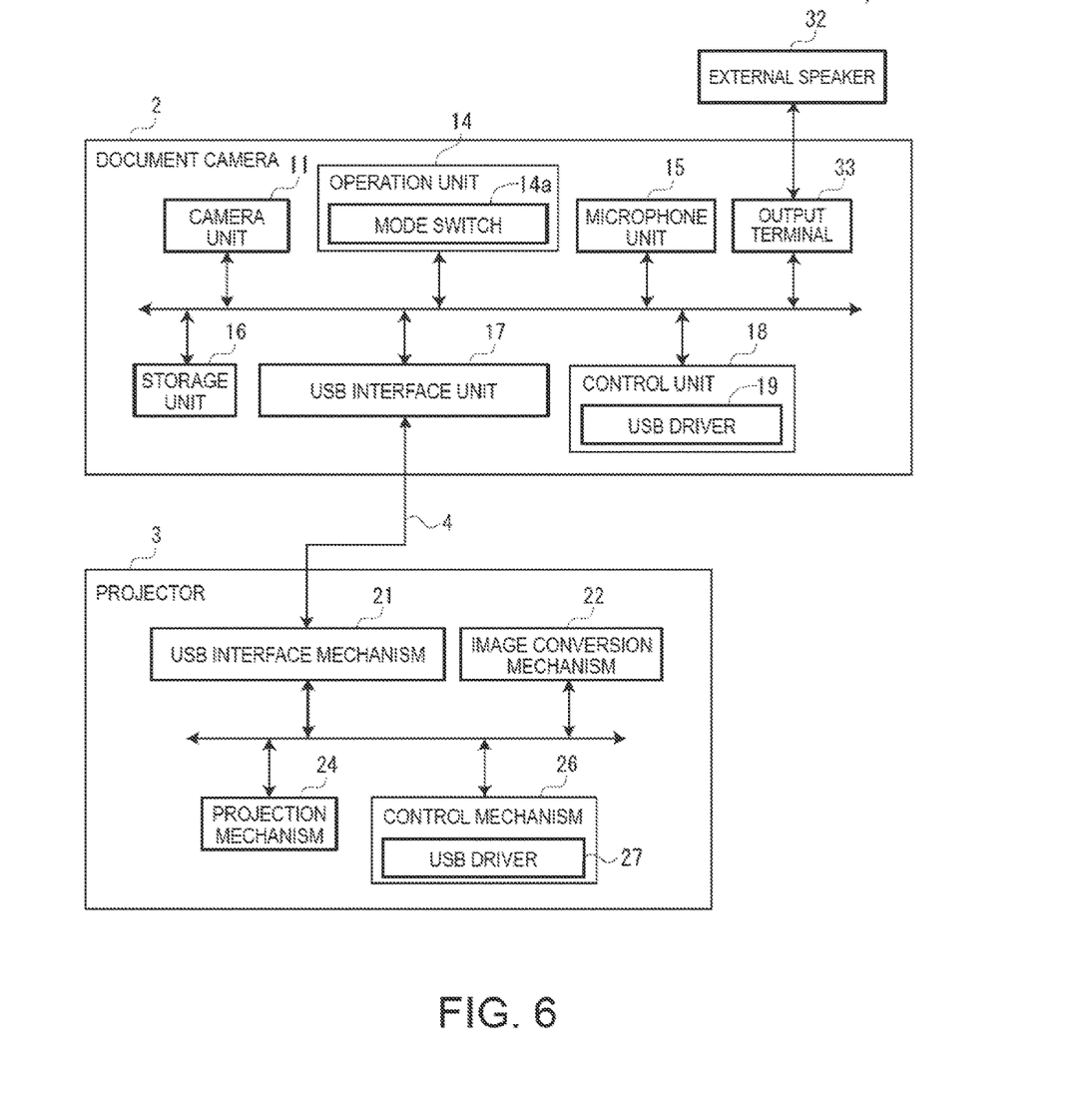
FIG. 6 shows the system configuration of a second modification of the projector system.

Also, while the embodiment is configured in such a way that an external output device (projector 3 or the like) carries out audio output and video output, the document camera 2 may carry out one or both of these outputs. For example, as shown in FIG. 5, the document camera 2 may have (inside) a speaker 31 (internal output device) so that the audio output may be carried out on the side of the document camera 2. In such a case, the audio output on the side of the document camera 2 and the video output on the side of the projector 3 are executed synchronously/asynchronously according to an instruction from the control unit 18 in the document camera 2. Also, as shown in FIG. 6, the document camera 2 may have an output terminal 33 (including wireless communication) of an external speaker (external output device) 32 so that audio output is carried out via the external speaker 32.

Figure 7:
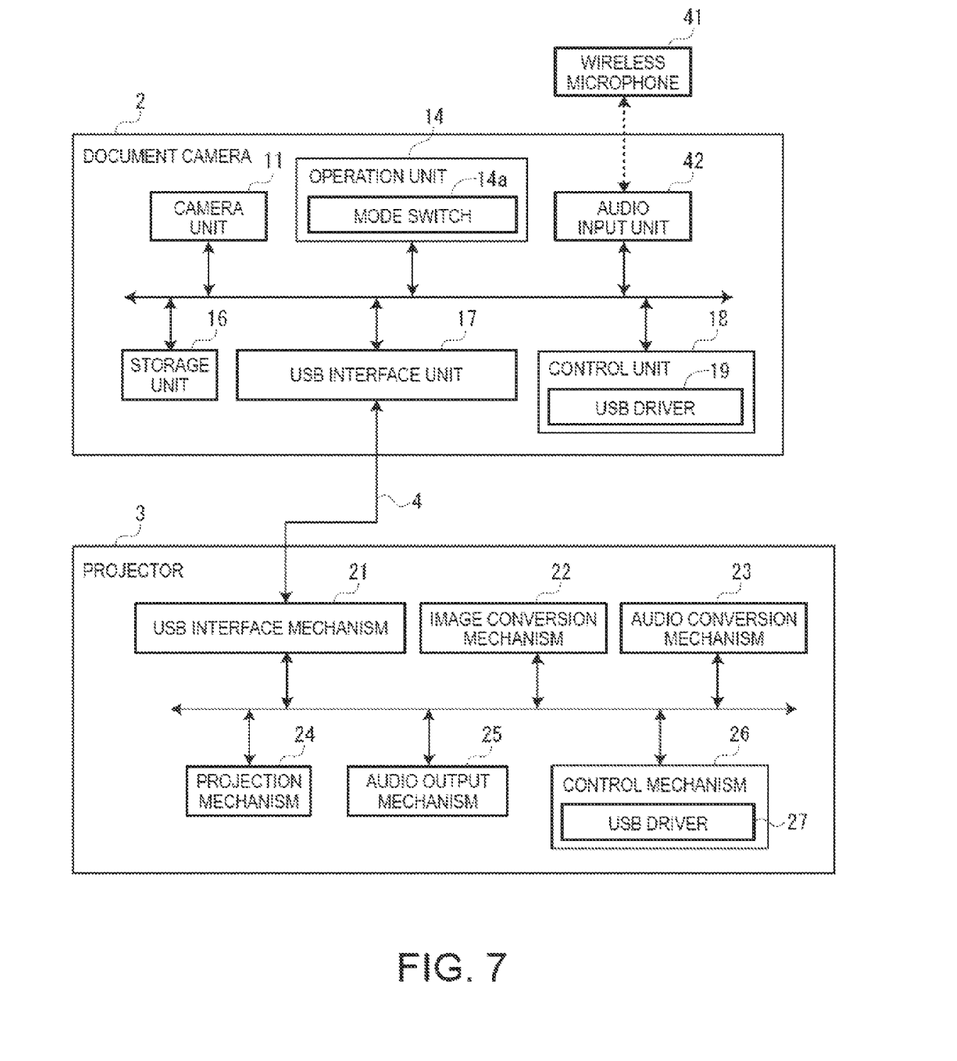
FIG. 7 shows the system configuration of a third modification of the projector system.

Moreover, while in the embodiment, the audio signal acquisition unit is formed by the microphone unit 15, the audio signal acquisition unit may be formed by an audio input unit that acquires an audio signal from an external microphone. For example, as shown in FIG. 7, the document camera 2 may further have an audio input unit 42 that inputs an audio signal from a wireless microphone 41 (FM transmitter microphone or the like) and the audio signal acquisition unit may be formed by this audio input unit 42.

Furthermore, while in the embodiment, the video signal acquisition unit is formed by the camera unit 11, the video signal acquisition unit may be formed by a video input unit that acquires a video signal from an external video camera.

Also, in the embodiment, the output operation in the case where a video signal and an audio signal are acquired is described as an example. However, the case where only one of the video signal and the audio signal is acquired may be expected. In such a case, the video signal or the audio signal is recorded without adding the time stamp thereto, or the video signal or the audio signal is transmitted without adding the time stamp thereto.

Moreover, in the embodiment, output of the audio signal acquired by the microphone unit 15 and sequential display (slide show display) of still images may be carried out synchronously. In such a case, the time stamp is added to the acquired audio signal and still image data and the audio signal and the still image data are recorded (audio recording) together with the time stamp in the storage unit 16. Also, in such a case, the timing of synchronizing the output of the audio signal and the display of the still images may be changeable. For example, according to the setting at the time of audio recording, the output of the audio signal may be delayed from the display of the still images, or the output of the audio signal may be precede the display of the still images.

Furthermore, the document camera 2 may have plural audio signal acquisition units (microphone unit 15 and the like) and audio signals acquired from the plural audio signal acquisition units may be outputted synchronously/asynchronously. In such a case, too, it is preferable that synchronism/asynchronism is switched according to the use mode.

What is claimed is:

1. A document camera comprising:
   a video signal acquisition unit which acquires a video signal;
   an audio signal acquisition unit which acquires an audio signal;
   a stamp adding unit which adds a time stamp for synchronizing the video signal and the audio signal with each other to the video signal and the audio signal that are acquired;
   a mode switching unit which switches between plural modes including a video recording mode in which a video is recorded and a sound reinforcement mode in which sound reinforcement is carried out;
   a video recording unit which records the video signal and the audio signal together with the time stamp if the video recording mode is switched on; and
   a sound reinforcement instruction unit which instructs an output device to output the video signal and the audio signal, ignoring the time stamp, if the sound reinforcement mode is switched on.

2. The document camera according to claim 1, wherein the output device is an external output device, and
   the sound reinforcement instruction unit transmits the video signal and the audio signal, and a control parameter that validates the ignoring of the time stamp, to the output device if the sound reinforcement mode is switched on.

3. The document camera according to claim 2, wherein the sound reinforcement instruction unit further transmits a control parameter about audio processing if the sound reinforcement mode is switched on.

4. The document camera according to claim 3, wherein the control parameter about audio processing includes a control parameter that validates echo cancellation.

5. The document camera according to claim 3, wherein the control parameter about audio processing includes a control parameter about volume control and/or sound quality control.

6. The document camera according to claim 1, wherein the plural modes of the mode switching unit further includes a playback mode in which the video recorded in the video recording mode is outputted to an output device,
   wherein, when the playback mode is switched on, the video signal and the audio signal recorded by the video recording unit are output to the output device synchronously, and
   when the sound reinforcement mode is switched on, the sound reinforcement instruction unit instructs the output device to ignore the time stamp and output the video signal and the audio signal asynchronously.

7. A video and audio output system comprising:
   a document camera which acquires a video signal and an audio signal; and
   an output device which outputs the video signal and the audio signal acquired by the document camera,
   wherein the document camera has:
   a video signal acquisition unit which acquires the video signal;
   an audio signal acquisition unit which acquires the audio signal;
   a stamp adding unit which adds a time stamp for synchronizing the video signal and the audio signal with each other to the video signal and the audio signal that are acquired;
   a mode switching unit which switches between plural modes including a video recording mode in which a video is recorded and a sound reinforcement mode in which sound reinforcement is carried out;
   a video recording unit which records the video signal and the audio signal together with the time stamp if the video recording mode is switched on; and
   a sound reinforcement instruction unit which instructs the output device to output the video signal and the audio signal, ignoring the time stamp, if the sound reinforcement mode is switched on, and
   the output device has an output unit which outputs the video signal and the audio signal outputted from the document camera, according to the instruction from the sound reinforcement instruction unit.

8. The video and audio output system according to claim 7, wherein the output device further includes a transmission unit which transmits a control parameter about audio output setting to the document camera.

9. A video and audio output method using a document camera having a video signal acquisition unit which acquires a video signal and an audio signal acquisition unit which acquires an audio signal, the method comprising causing the document camera to execute:

adding a time stamp for synchronizing the video signal and the audio signal with each other to the video signal and the audio signal that are acquired;

switching between plural modes including a video recording mode in which a video is recorded and a sound reinforcement mode in which sound reinforcement is carried out;

recording the video signal and the audio signal together with the time stamp if the video recording mode is switched on; and     instructing an output device to output the video signal and the audio signal, ignoring the time stamp, if the sound reinforcement mode is switched on.

\* \* \* \* \*